C. SCHULZE.
COMBINED WING BRACE AND WAGON STAKE SOCKET.
APPLICATION FILED JULY 5, 1912.
1,048,747.
Patented Dec. 31, 1912.
2 SHEETS—SHEET 1.
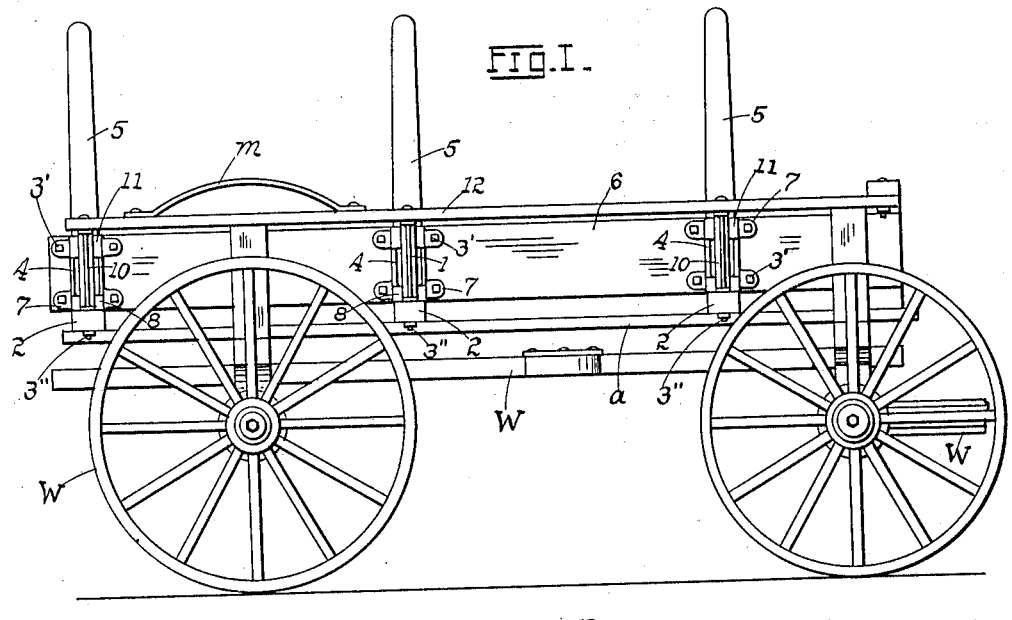
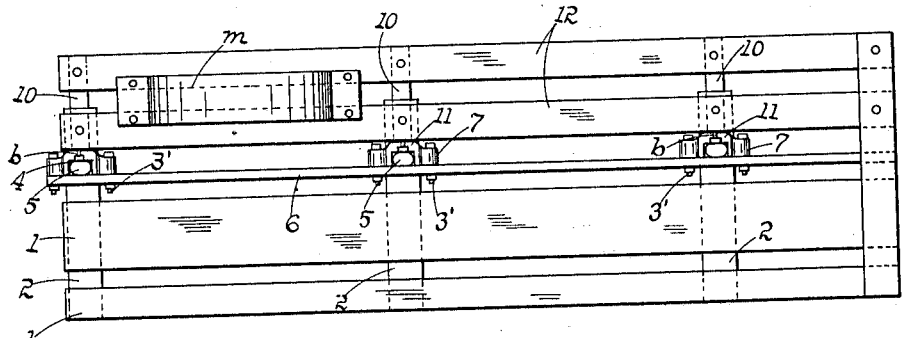
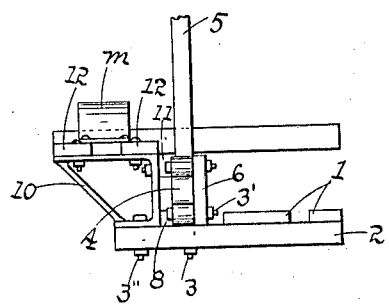
WITNESSES:
Harry A. Beimes
Fannie E. Weber
INVENTOR.
Charles Schulze.
BY
ATTORNEY.

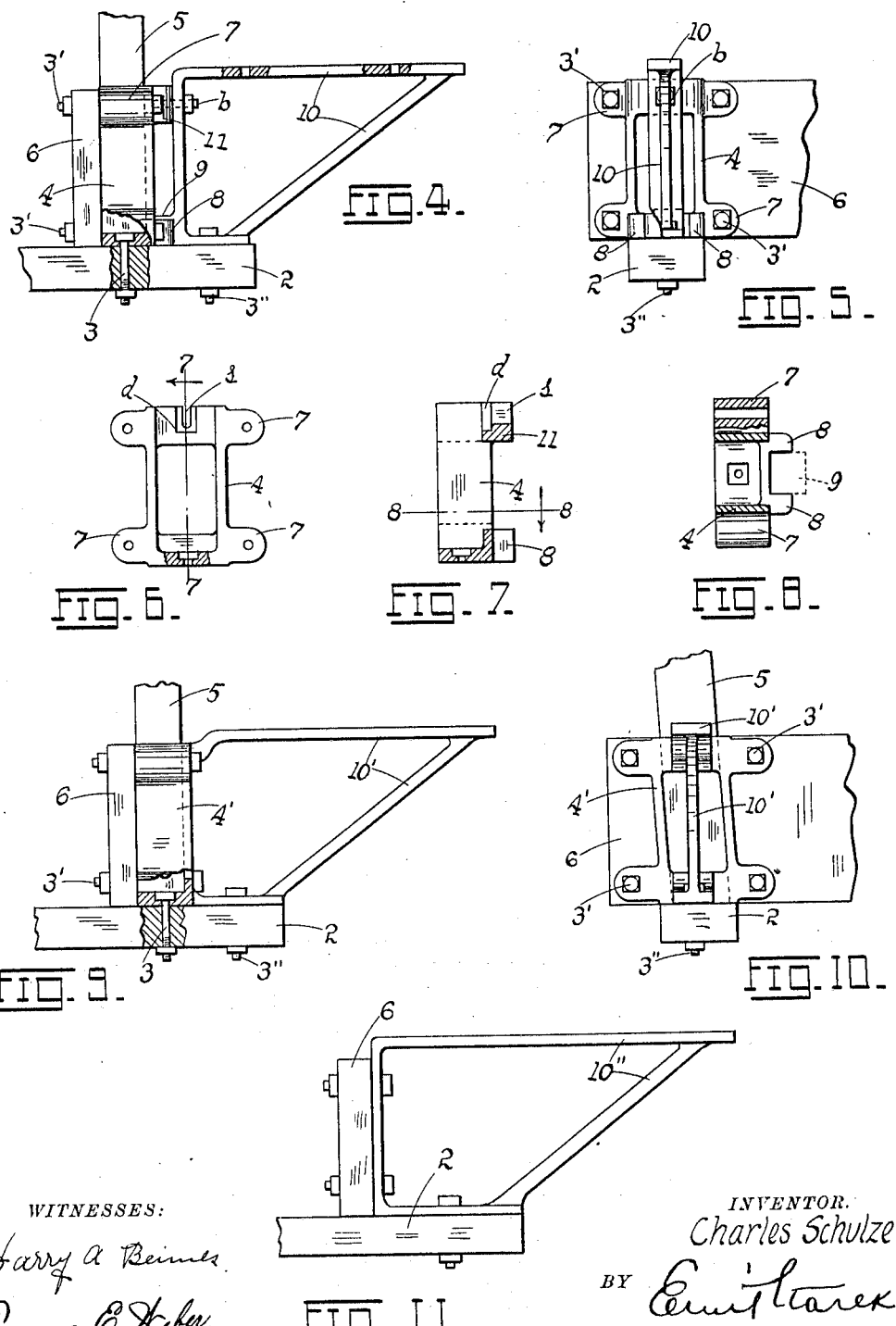

UNITED STATES PATENT OFFICE.

CHARLES SCHULZE, OF GOLDEN EAGLE, ILLINOIS.

COMBINED WING-BRACE AND WAGON-STAKE SOCKET.

1,048,747.

Specification of Letters Patent. Patented Dec. 31, 1912.

Application filed July 5, 1912. Serial No. 707,844.

*To all whom it may concern:*

Be it known that I, CHARLES SCHULZE, citizen of the United States, residing at Golden Eagle, in the county of Calhoun and State of Illinois, have invented certain new and useful Improvements in Combined Wing-Braces and Wagon-Stake Sockets, of which the following is a full, clear, and exact description, reference being had to the accompanying drawings, forming a part hereof.

My invention has relation to improvements in combined wing-braces and stake-sockets for wagons; and it consists in the novel details of construction more fully set forth in the specification and pointed out in the claims.

In the drawings, Figure 1 is a side elevation of a wagon-truck, showing my invention applied to a hay-rack deposited on the truck; Fig. 2 is a top plan of one-half of the rack; Fig. 3 is an end view of one-half of the rack with my invention applied; Fig. 4 is a side view of the stake-socket and bracket secured thereto; Fig. 5 is a face view of Fig. 4; Fig. 6 is a rear view of the stake-socket detached; Fig. 7 is a vertical middle longitudinal section on the line 7—7 of Fig. 6; Fig. 8 is a horizontal section on the line 8—8 of Fig. 7; Fig. 9 is a side view of a modified form of stake-socket and bracket; Fig. 10 is a face view of Fig. 9; and Fig. 11 is a side view of a still further modification of bracket.

The object of my invention is to construct a supporting bracket for the side wings or running boards of wagons (particularly hay-wagons) to which bracket the stake socket may be directly secured, the bracket being self-supporting and requiring no additional bracing outside of the securing bolt by which it is fastened to the wagon-body.

In the present embodiment of my invention, the same is applied to a hay-rack, though it may be used on the body of any wagon the truck portion of which is adapted to support such body.

In the invention as illustrated the hay-rack is substituted for the conventional wagon body, and as applied to such rack, the invention may be described in detail as follows:

Referring to the drawings, and for the present to Figs. 1 to 8 inclusive, W represents a wagon or truck of any conventional design on which the hay-rack is deposited. The rack comprises a flooring composed of a series of longitudinally disposed planks or slats 1, 1, secured to a series of transverse members 2, the whole being deposited on the floor $a$ of the wagon or truck as shown. To the opposite ends of the cross-members 2 are secured by means of bolts 3 (or otherwise), the sockets or channel castings 4, the channels receiving the detachable stakes 5, the series of sockets on each side of the rack having secured thereto the vertically disposed planks 6 resting on the members 2 and forming the sides of the rack, the stake-sockets being provided with pairs of perforated lugs 7 for the insertion of bolts 3' by which the planks 6 are secured in position. In the preferred form of my invention, the bottom of the outer face of each stake-socket 4 has formed a pair of lugs 8, 8, between which is received the rear basal tongue or lug 9 of a four-sided bracket 10, resting with its short side on the member 2 and secured thereto by bolts 3'', the upper portion of the vertical wall of the bracket bearing against a central hollow terminal boss 11 on the stake-socket, said boss being provided with a recess $s$ for the passage of the stem of a securing bolt $b$ the head of which rests in a depression $d$ when the parts are assembled. The horizontal top members of the brackets serve to support and secure the running boards or side wings 12 of the rack. The rear ends of the wings 12 preferably carry a mud-guard $m$ directly over the wheels of the rear wagon-truck.

In Figs. 9 and 10, I show a modification of stake-holder or socket in which the channel of the socket 4' is inclined so as to hold the stake 5 at a slight angle from the vertical. In this modification the bracket 10' is cast integrally with the socket 4'. In other respects the construction is the same as in the first form described.

In Fig. 11 I show a bracket 10'' bolted to the cross-timber 2, the plank 6 being secured directly to the rear vertical wall of the bracket, no provision being made however, for any stakes.

Features illustrated in the drawings, but to which no reference is made are all well known in the art and need not be described in the present connection.

Having described my invention, what I claim is:—

1. A wing-brace comprising a four-sided bracket having a short bottom side and a long top side parallel thereto, a vertical inner side and an outer inclined side, in combination with a supporting member engaging the bottom side, a channel-piece coupled to the vertical side of the brace, and a member resting on the supporting member aforesaid and forming a socket with the channel of the channel-piece, as set forth.

2. In combination with a horizontal supporting member, a combined wagon wing-brace and stake-socket comprising a wing-supporting bracket resting on said member and projecting beyond the same, a channel piece resting on said member and secured to the bracket, a vertically disposed plank secured to the channel piece opposite the channel and forming a stake socket, the outer face of the channel-piece being provided with a pair of bottom lugs, the bracket having a bottom tongue on its inner side inserted between the lugs of the channel piece, the upper end of the channel-piece being provided with a hollow boss engaging the bracket, said boss being provided with a recess for a securing bolt, and a depression about said recess for the reception of the head of said bolt, as set forth.

In testimony whereof I affix my signature, in presence of two witnesses.

CHARLES SCHULZE.

Witnesses:
   EMIL STAREK,
   FANNIE E. WEBER.

---

Copies of this patent may be obtained for five cents each, by addressing the "Commissioner of Patents, Washington, D. C."